United States Patent [19]

Dobbs et al.

[11] 4,352,555
[45] Oct. 5, 1982

[54] CONTROLLED DOUBLE EXPOSURE METHOD AND APPARATUS

[75] Inventors: Gregg Dobbs; Laura P. Dobbs, both of Windermere, Fla.

[73] Assignee: Fotozines, Inc., Windermere, Fla.

[21] Appl. No.: 291,041

[22] Filed: Aug. 7, 1981

[51] Int. Cl.³ .................. G03B 27/32; G03B 17/24; G03B 17/26; G03B 15/00
[52] U.S. Cl. .................................. 355/77; 354/109; 354/276; 354/291
[58] Field of Search ......... 354/109, 110, 108, 202 FF, 354/275, 276, 290, 291, 296; 355/77, 40 FP

[56] References Cited

U.S. PATENT DOCUMENTS

| | | |
|---|---|---|
| 360,314 | 3/1887 | Lewis .................................. 354/276 |
| 547,855 | 10/1895 | Lee .................................... 354/290 X |
| 1,268,609 | 6/1918 | Powell ............................. 354/276 X |
| 3,665,828 | 5/1972 | Reiter .............................. 354/291 X |
| 3,928,863 | 12/1975 | Stewart et al. ...................... 354/109 |
| 4,268,144 | 5/1981 | Wheeler ............................. 354/108 |
| 4,310,232 | 1/1982 | Reed ............................... 354/291 X |

FOREIGN PATENT DOCUMENTS 2321463 11/1973 Fed. Rep. of Germany ...... 354/109

Primary Examiner—Donald A. Griffin
Attorney, Agent, or Firm—Duckworth, Allen, Dyer & Pettis

[57] ABSTRACT

A positive-to-positive color photographic paper is given a first exposure to create a latent image of a desired background such as a magazine cover with a large area unexposed, utilizing a negative plate and original color artwork. The preexposed paper is stored in a light-tight package. Later, a second exposure of a desired subject is made on the previously unexposed portion using a positive plate of the originally exposed material in a specialized view camera. The view camera uses several selectable fixed focus positions to enable unskilled personnel to perform the second exposure. The paper is then processed rapidly at high temperature, producing a high quality color photograph in a few minutes. A typical use is to provide a person with their photograph as the cover picture on a simulated national magazine cover.

8 Claims, 9 Drawing Figures

CONTROLLED DOUBLE EXPOSURE METHOD AND APPARATUS

BACKGROUND OF THE INVENTION

1. Field of the Invention

The present invention relates to a controlled double exposure color photographic process and more particularly to a process which will permit adding a subject such as a person into a picture of a scene or a background previously photographed.

2. Description of the Prior Art

A popular and entertaining process developed a number of years ago involved the preparation of a newspaper front page with the headline area blank. At amusement centers, and the like, a person could have his name set in type and printed in the headline area with an appropriate "news item". Such novelty operation is easily accomplished. An even more striking example of this type of novelty would be that of producing a colored photograph of a person on the front cover of a national magazine, such as Time, Life, or other popular publication. Although such results could be obtained through normal photographic processes, such a print would be extremely expensive and require days to weeks to obtain. Thus, a process for producing a high quality color photograph of a person on a simulated cover of a popular magazine, or with other specialized framing or boardering, which could be completed in a few minutes and which would be long lasting would be very popular with the public that visits amusement centers, parks, and various tourist attractions. For example, a marked trend in the periodical publication business today is that of special interest magazines of which there are literally hundreds available which cater to the special hobbies, sports, and other interests of the public. For example, a person who greatly enjoys golfing undoubtedly would be delighted to obtain a simulated front cover of a popular golf magazine with his own portrait on the front cover in full color with a notation of "Golfer of the Year" or similar whimsical headline.

SUMMARY OF THE INVENTION

The invention involves a process for preparing a special positive color print paper with a first exposure, and at a later time, making a second exposure in a novel view camera. A subject to be photographed has his image exposed on a sheet of the specially prepared paper, the paper removed, processed, dried and delivered to the subject, all in a period not greater than five minutes. The result is a glossy, permanent color photograph of the subject against a background present on the photographic paper from its previous preparation. The photograph is extremely sharp with saturated colors and is equal to results obtained with conventional negative-positive color printing. Furthermore, the special paper utilized is extremely stable and resistant to fading of the colors.

Assume for purposes of description that the final photograph is to be that of the subject on the cover of a popular magazine. To prepare the paper for such use, a conventional copy-camera is utilized to photograph color artwork representative of the desired magazine cover with the area normally used for a picture left blank and unexposed. Advantageously, our process does not require extensive color artwork because of the novel method utilized. A negative plate, the same size as the color paper to be exposed, is produced having all of the desired lettering, such as the name of the magazine, typical content headlines, and the desired label or cut line to be associated with the subject to be added later. This negative will have all of the lettering and decorative borderlines or the like which are to appear in color transparent. The remainder of the plate will be opaque. Register holes are provided outside of the active portion of the negative plate. As may now be understood, the original color artwork need be provided with only blocks of color on art board such that when the negative plate is overlaid on the artwork, the desired colors may be seen through the clear or transparent portions of the negative. The negative plate may be produced from an actual magazine cover shot on litho-type negative film in which the undesired portions of the cover are blacked out. Thus, a minimum of original lettering is required which may be accomplished with readily available transfer-type letters.

After the original color artwork board is prepared and the negative plate is prepared, a sheet of the color print paper is cut to the exact size of the negative plate which, of course, should approximate the actual magazine cover size. A positive to positive type color paper is used of the type common in the lithography industry and referred to as "stat" color paper. While such paper may be available from several sources, we prefer a type known as high temperature chromium color stat paper available in the United States from Visual Graphics Corporation and is manufactured in Switzerland by the Ilford Company. This paper appears to have a plastic base and is very rugged and easily handled. The paper has an ASA number of 4.5.

After punching the paper with registration holes, the paper is in a paper holder on registration pins with the emulsion side out and the negative plate placed over the paper. The camera is focused on the original artwork so that its image exactly coincides with the size of the paper. The paper holder with the negative plate is then inserted in the camera and exposed. Working in the dark, the paper carrier is removed and the exposed paper which, as may be now understood, will have all of the lines and lettering from the negative plate exposed in their required colors. This paper is then placed back in a light safe envelope or box. Of course, a large number of preexposed paper for the particular magazine cover would be produced once the set-up is made. For example, we find that about 300 per hour can be produced once the set-up is complete.

In accordance with our process, a booth or studio in which the final photographs will be made is supplied with a quantity of preexposed backgrounds and with a variety of simulated magazine covers or other designs so that a patron may make his choice.

At the studio or booth in which the second exposure is to be made, we provide a novel view camera which can be operated by even the most inexperienced operator. As may be understood, a desired objective of being able to provide the finished product at a relatively low price could not be achieved if persons highly skilled in photographic processes were required to take and process the final picture. Therefore, we utilize a novel fixed focus view camera having a L-shaped body. A 45° mirror is installed in the corner of the L such that the image projected on the paper will be reversed from left to right since a positive to positive paper is being used. One leg of the L carries the lens which should be a very high quality lens, and the other leg of the L includes guides for inserting a sensitized paper holder through a light-tight door. We have provided three different paper holder slides which, as will be noted, will require a different distance of the subject from the lens to be in focus. One slide may permit a closeup of just the head or face of the subject, the second may be in focus for a head and shoulders view, while the third may be in focus for a three quarter or full length view. The camera is mounted on a tripod and dolly. An exact position is provided for the subject which may be a stool or other means, and three exact focus positions may be marked on the floor. The operator merely slides the dolly to the mark indicative of focus for the view desired.

Before taking the picture of the subject, it must be determined that the subject is in the exact position to match the area on the simulated magazine cover upon which the picture is to appear and also means must be provided to prevent exposure of the already exposed lettering and other lines previously described. To this end, we prepare a positive plate for each background. In the example being used, a positive plate, which would be the exact reverse of the negative plate used during preparation of the paper, is produced having registration holes identical to those of the negative plate. Two versions of this positive plate are required in our process. The first, just described, will be used in the paper carrier or holder when the subject's photographic is taken and the other is mounted in a frame of the same size as the paper holder which will mount a positive plate in the exact position that the positive plate will occupy when the paper holder is in place in the camera. We refer to this frame as a focal plate. It is installed in the appropriate paper holder slide. The back of the camera is opened and the operator may then view the subject in the same manner as using a ground glass to focus in a conventional view camera. The subject is then instructed to move as required to place the image in the exact position desired with respect to the lettering.

As soon as this step is accomplished, the back of the camera is closed, and the focal plate removed. The preexposed paper is installed with emulsion side out in the paper holder over register pins, the positive plate is placed over the emulsion, a dark slide inserted and the holder inserted in the appropriate slide. A light-tight door is then closed over the paper holder. The dark slide is removed from the paper holder, the shutter opened, and a very high powered flash strobe lamp is flashed. The dark slide is replaced and the paper holder removed.

The preferred paper requires sequentially a developer, two bleach solutions, and a fixing bath which is accomplished at high temperatures in a special four bath processor available from Visual Graphics Corporation. The time through the processor is dependent upon the temperature; however, we have found that the temperature which will permit development and fixing in four minutes is admirably suitable. The double exposed paper is then removed from the paper holder and processed in the four bath processor. After processing, it is put through an automatic washer which washes and drys the print in about thirty seconds.

The result is a brilliant, high gloss reproduction of a magazine cover or the like with a clear sharp brightly colored photograph of the subject appearing as if he were the featured celebrity of the month.

It is therefore a principle object of the invention to provide a method of preexposing a positive-to-positive color photographic paper with a specialized background and storing the exposed but undeveloped paper for later adding an additional exposure thereto and to process the double exposed paper to a finished product within a few minutes.

It is another object of our invention to provide a special view camera having several fixed focus positions for producing the second exposure on the preexposed color paper that can be operated with personal having no photographic skills.

It is still another object of our invention to provide a method and apparatus for booths at amusement centers in which a patron can obtain a top quality color portrait having a novel background, such as a simulated popular magazine cover, at a low price and in a few minutes.

It is yet another object of our invention to provide a method of producing controlled double exposures on photographic paper through the use of a negative plate during the first exposure and a positive plate during the second exposure.

These and other objects and advantages of our invention will become apparent from the following detailed description and the drawings.

DETAILED DESCRIPTION OF THE PREFERRED EMBODIMENT

Figure 1:
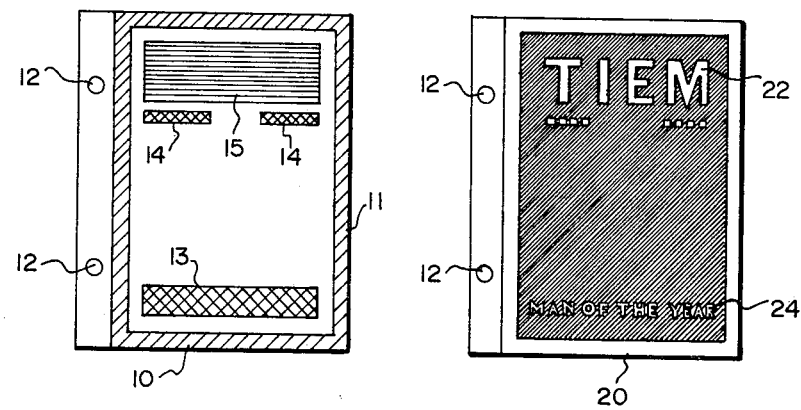
FIG. 1 is a view of an original artwork, and a negative plate utilized in the first exposure of the color paper.

The first step in the process of our invention is to prepare an original artwork and a negative plate for the first exposure. Referring to FIG. 1, an example of an original color artwork 10 is shown. Artwork 10 may be on art board and is in the colors desired for the lettering and other graphics desired in the final photograph. For purposes of description, a magazine cover will be used in which it is desired that the subject's picture appear as the cover picture for that particular issue. For exemplary purposed, a fictional magazine "TIEM" will be used. The original artwork 10 defines a border 11 which may be yellow in color as indicated by the diagonal cross hatching. It is desired that the magazine title be in red and a block of red 15 is provided, indicated by the horizontal lines. Generally, a simulated magazine cover would not carry an actual date line but is generally termed a special issue or the like. This lettering is desired, in this example, to be in blue as indicated by cross hatched blocks 14. Although any desired title may be utilized for the photograph of the subject, the appellation "Man of the Year" is used in this example. It is desired that this lettering appear in blue as shown by the cross hatched block 13.

A negative plate 20 is prepared, preferably from a heavy weight lithographic film for durability since it is contemplated that large numbers of first exposures will be made. Where an actual magazine cover is to be reproduced, a typical issue would be chosen and all unwanted areas would be blacked out leaving only the title and perhaps certain headlines indicating contents of that issue for realism. In this example, only the title is retained from the original magazine cover. The added lettering such as "Man of the Year" 24 is added by an artist or by readily available transfer letters. Similarly, the desired issue identification is added as indicated by the small squares 23. After preparation of negative 20, registration holes 12 are punched into the unused border portion thereof. Original artwork 10, which is preferably made in the exact size of negative 20 so that registration may be accurate, also includes registration holes 12.

Figure 2:
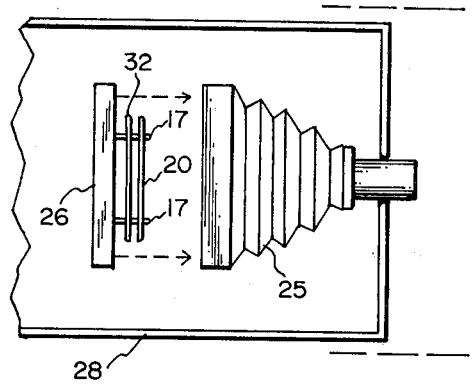
FIG. 2 is a simplified diagram of the copy camera set-up for producing the first exposure.

Turning to FIG. 2, a simplified plan view of the copy camera set-up for producing the first exposure is shown. Room 28 is a darkroom with view camera 25 mounted therein with its lens projecting through one wall of the room. A copy easel or stand 30 may be set-up in the adjacent room. The easel has register pins 17 which are accurately aligned with copy camera 25 so that that image in the camera is accurately positioned. Camera back 26 is shown open and with the installed elements expanded in a simplified and exaggerated fashion to better illustrate the arrangement. A sheet of positive to positive color paper 32, preferably the high temperature chromium color stat paper available from Visual Graphics Corporation previously described is cut to the exact size of negative 20 and has registration holes 12 punched or drilled therein to ensure exact registration. Thus, when back 26 is loaded, paper 32 is placed over register pins 17 with the emulsion side of the paper outward. Negative plate 20 is then installed over register pins 17, and the back closed ready for the first exposure. The preferred color paper is balanced for tungsten light and therefore, we prefer to illuminate the original art board 10 with tungsten light to maintain color balance. We have found that the amount of light to produce a three to four second exposure is suitable. Thus, the shutter of camera 25 is opened for the required exposure time and, thereafter, back 26 is removed. The exposed color paper 32 is placed in a light-tight pack.

For successful operation of a booth or studio to produce the finished product for our invention, it is necessary to provide a large number of different backgrounds to suit the varying tastes and likes of the public. Therefore, in practice, a number of sets of negative 20 and artwork 10 would be produced. It is also contemplated that a large number of first exposures of a particular background would be made at one time, stored in appropriate light-tight boxes and labeled appropriately for future second exposure.

Figure 3:
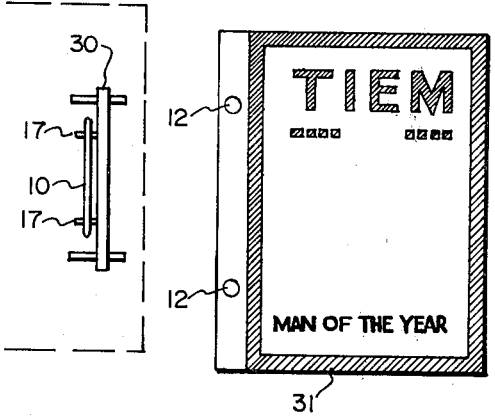
FIG. 3 shows a positive plate utilized in the second exposure of the paper.

The preceding description represents the first stage in our process of providing a supply of preexposed color paper having special backgrounds disposed thereon but not developed. Turning now to the second stage of our process, a positive plate 31 as shown in FIG. 3 is prepared which may also be done on heavyweight lithographic film. This plate is the reverse of the negative plate 20, being completely opaque where any color which has previously been exposed occurs. As will be understood, negative 20, during the process described with respect to FIG. 2, is opaque every place except where color is desired and therefore such portion of the color paper under the opaque portion will be unexposed. Positive plate 31 is therefore completely transparent for the unexposed portion of the preexposed paper and completely opaque for all exposed portions. Register holes 12 are provided in positive plate 31 to permit exact registration.

Figure 4:
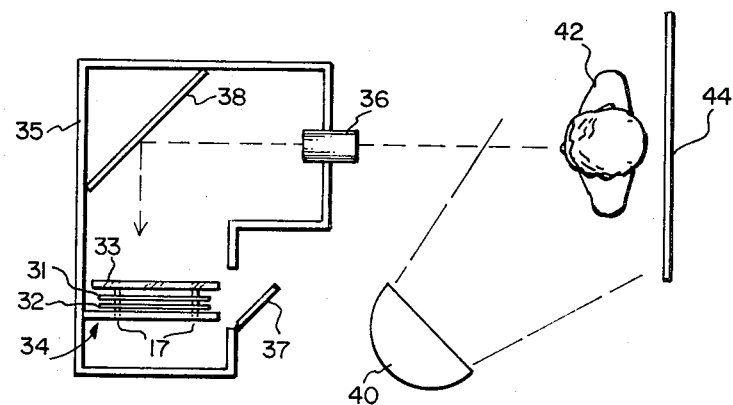
FIG. 4 is a greatly simplified plan view of the special view camera set-up for making a second exposure on the color paper.

In FIG. 4 a simplified plan view of a set-up for providing a second exposure of a person to appear in the unexposed portions of the preexposed color paper is shown. Our novel view camera, which will be explained in more detail hereinafter, is indicated at 35 by a cross sectional view. The camera has a generally L-shaped body with lens 36 in one portion of the L and provisions for the paper and plate holder shown generally at 34 in the other leg of the L. The paper holder 34 is indicated in greatly simplified and exaggerated form to more clearly illustrate the principles of this portion of our invention. A light-tight door 37 may be opened to insert paper holder 34. A glass plate 33 has register pins 17 cemented thereto. The holder 34, when assembled, has preexposed paper 32 with the emulsion side out. Positive plate 31 is installed on register pins 17 and, as will be recognized, the opaque portions will exactly match the preexposed portions of paper 32 to prevent the second exposure from affecting such portions. When the holder 34 is loaded, glass 33 holds positive plate 31 firmly against paper 32. FIG. 4 is shown with a dark slide removed but it is, of course, understood that holder 34 is loaded in the dark with an appropriate dark slide. With paper holder 34 loaded and in place and a subject 42 positioned in front of a backdrop 44, the dark slide is removed and door 37 closed. The shutter of lens 36 is opened and strobe light 40 is flashed. Due to the relatively slow speed of the preferred positive color paper, very intense strobe lights are required. For example, we prefer to use a bank producing about 1200 watt-seconds of energy. The strobe lights are advantageous because of the short duration. Any movement of the subject 42 would not affect the sharpness of the photograph. A lens filter corrects the strobe light to the spectrum of tungsten light to match the paper characteristics. Since paper 32 will produce a positive to positive image, lens 36 would, in a normal type camera, result in a reversal of left to right in the photograph, producing a mirror image. Therefore, we utilize a diagonal mirror 38 which serves to reverse the image falling on paper 32 from left to right producing the required orientation of the subject. After exposure, the dark slide is replaced, and paper holder 34 removed from the camera 35. The double exposed paper 32 is removed and processed in the special high temperature, high speed processor described above. Thus, a completed double exposed photograph representative of the magazine cover is available to the subject within a few minutes.

Figure 5:
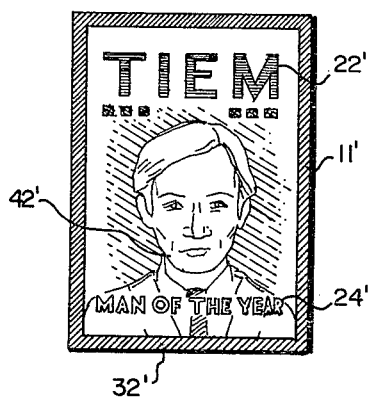
FIG. 5 is a representation of a typical finished photograph in accordance with our invention.

FIG. 5 is a representation of the finished product for the example being described. Developed and processed paper 32' has the registration border trimmed off. The preexposed printed portions will appear in their desired colors, for example, yellow border 11', red lettering 22', and blue lettering 24'. The photograph of the subject 42' will appear and is indicated "Man of the Year" with the color of background 44 serving as the background for all of the cover not otherwise exposed. As may now be recognized, a very novel and entertaining simulation of TIEM magazines "Man of the Year" is available to the subject to amuse his friends and relatives and, even more importantly, to provide an excellent high quality color portrait which is highly stable and may become a cherished possession over the years. We have found by experience that a photograph of the type shown in FIG. 5 may be delivered to the subject for less than $10.00 and is therefore far cheaper than a comparable professional photograph could be obtained. As will be discussed in more detail below, the second exposure is easily accomplished by personnel with no photographic experience or skills.

Figure 8:
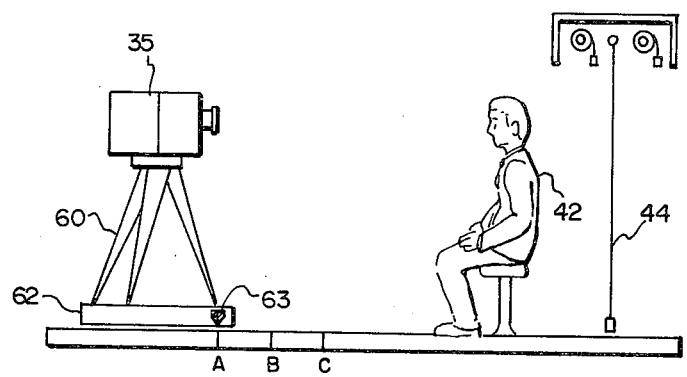
FIG. 8 is a simplified diagram of the arrangement used in making the second exposure with reference to indexing the camera for three fixed focus positions.
Figure 6:
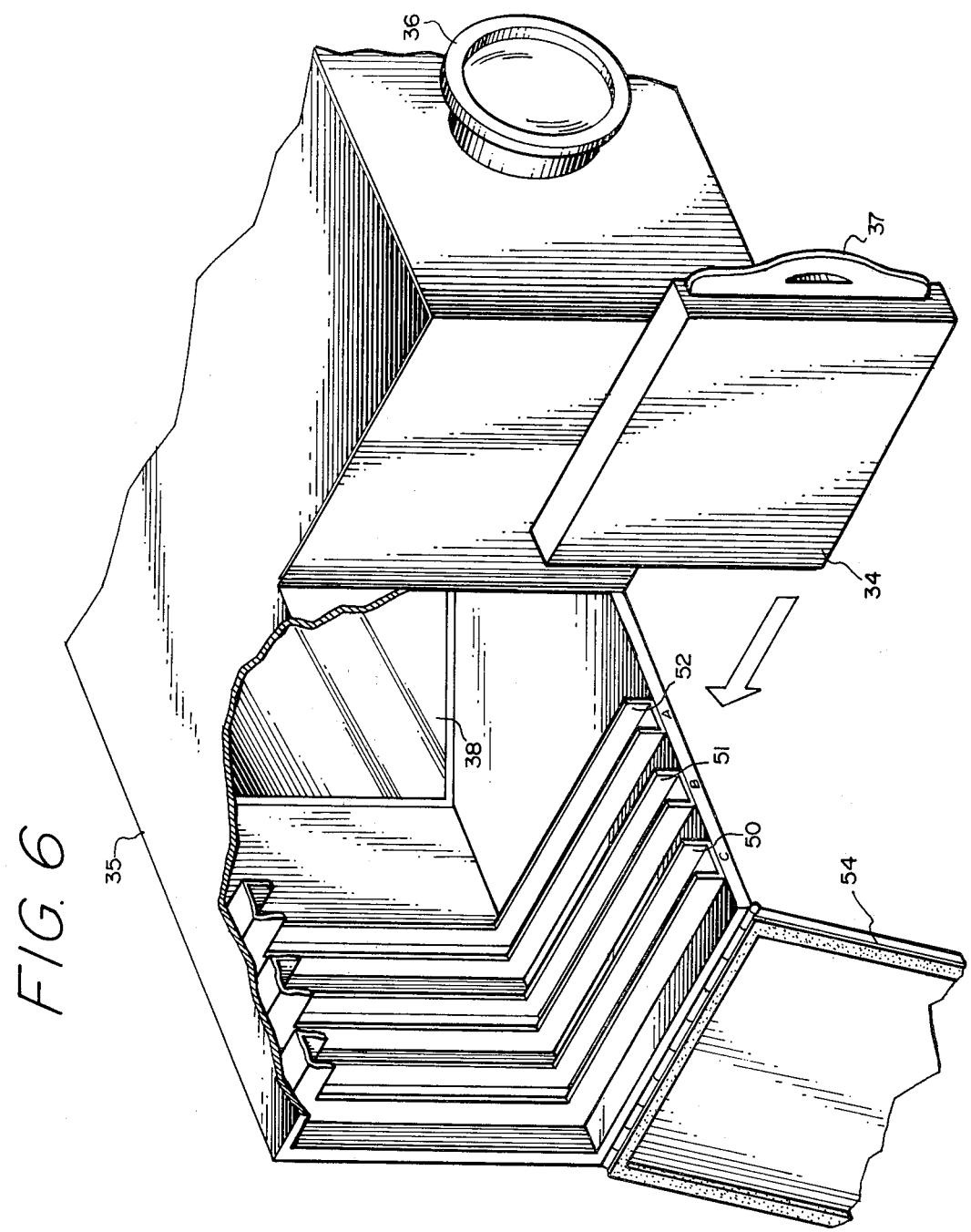
FIG. 6 is a partial perspective view of the special view camera showing the fixed focus slides.

In attempting to achieve an important object of our process, that of obtaining high quality results with unskilled personnel, we found none of the view cameras known in the prior art to be suitable. FIG. 6 shows a partial and cut away perspective view of the novel view camera of the invention which permits this important objective to be obtained. The camera 35 utilizes an L-shaped body as discussed with respect to FIG. 4. The rearward portion of the L is shown cut away to reveal parts of the slides 50, 51, and 52 which receive the paper holder 34. As will be noted, each holder slide 50, 51, and 52 is a different distance from lens 36. Therefore, the distance of the focal point in front of lens 36 will also differ. Referring to FIG. 8, the significance of the slide placement may be understood. Assume that a close-up of only the subjects head is desired. In such case, paper holder 34 would be inserted in slide 50 which produces the focal point closest to lens 36. In FIG. 8, camera 35 is shown mounted on tripod 60 and dolly 62 with dolly 62 having an index mark 63 thereon. For the head view, dolly 62 would be moved forward until index 63 is aligned with mark C, such mark having been carefully predetermined. Thus, the paper in holder 34 will be at exactly the distance from lens 36 via diagonal mirror 38 to the emulsion to achieve exact focus, with lens having sufficient depth of field to have the entire head in focus. If subject 42 were standing for a desired three quarter or full length view, the dolly would need to be moved back to point A and the paper holder inserted in slide 52. Point B would similarly produce a head and shoulders view with holder 34 in slide 51. It is obvious that this simple fixed adjustable focus structure may be easily implemented and used by even the most inexperienced worker. A greater number of positions can be provided dependent upon the user's needs. In order to suit a variety of preexposed backgrounds, it is desirable to have a number of different color or design backgrounds 44 which can be identified and selected with each preexposed design.

Although not shown in the cut away view of FIG. 6, a light-tight door is provided as indicated in FIG. 4 which will close over the unused slides when ready to make the second exposure.

Figure 7:
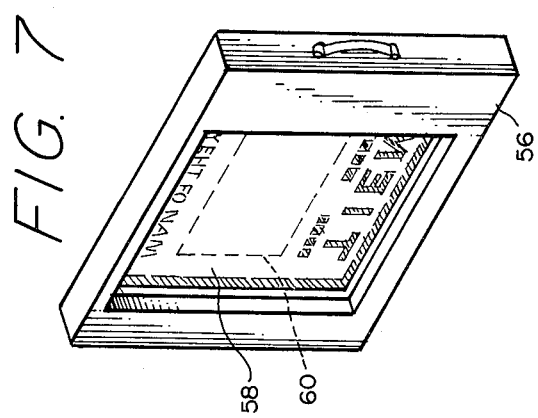
FIG. 7 is a perspective view of the focal plate utilized in positioning the subject for the second exposure.

It is extremely important that the subject 42 be in the correct position with respect to the lettering and other graphic material on the preexposed paper. To permit an unskilled person to position the subject properly, we have provided a novel focal plate device 56, shown in FIG. 7, for this purpose. A glass plate 58 is prepared and is essentially identical to positive plate 31 shown in FIG. 3. The open area in which the subject is to appear, shown by dashed lines 60, is clear or may be ground to provide a ground glass screen. The operator, prior to installing paper holder 36, installs focal plate 56 in the proper slide 50, 51 or 52, opens camera back 54 and observes the subject's image on the ground glass. The operator then instructs the subject to move appropriately to get exact centering of the image required by the background. When the subject is in position, the focal plane unit 56 is quickly removed, the paper holder 34 inserted in its place, the camera closed, the dark slide removed, and the strobe unit 40 flashed. As may be noted, this operation can be performed quickly and it is relatively easy for the subject to hold his position for such time as necessary to complete the exposure.

As may now be recognized, we have provided a simple but rugged view camera having the special features and functions required to permit operation by unskilled personal and to produce extremely sharp, well focused, and well composed final photographs.

Figure 9:
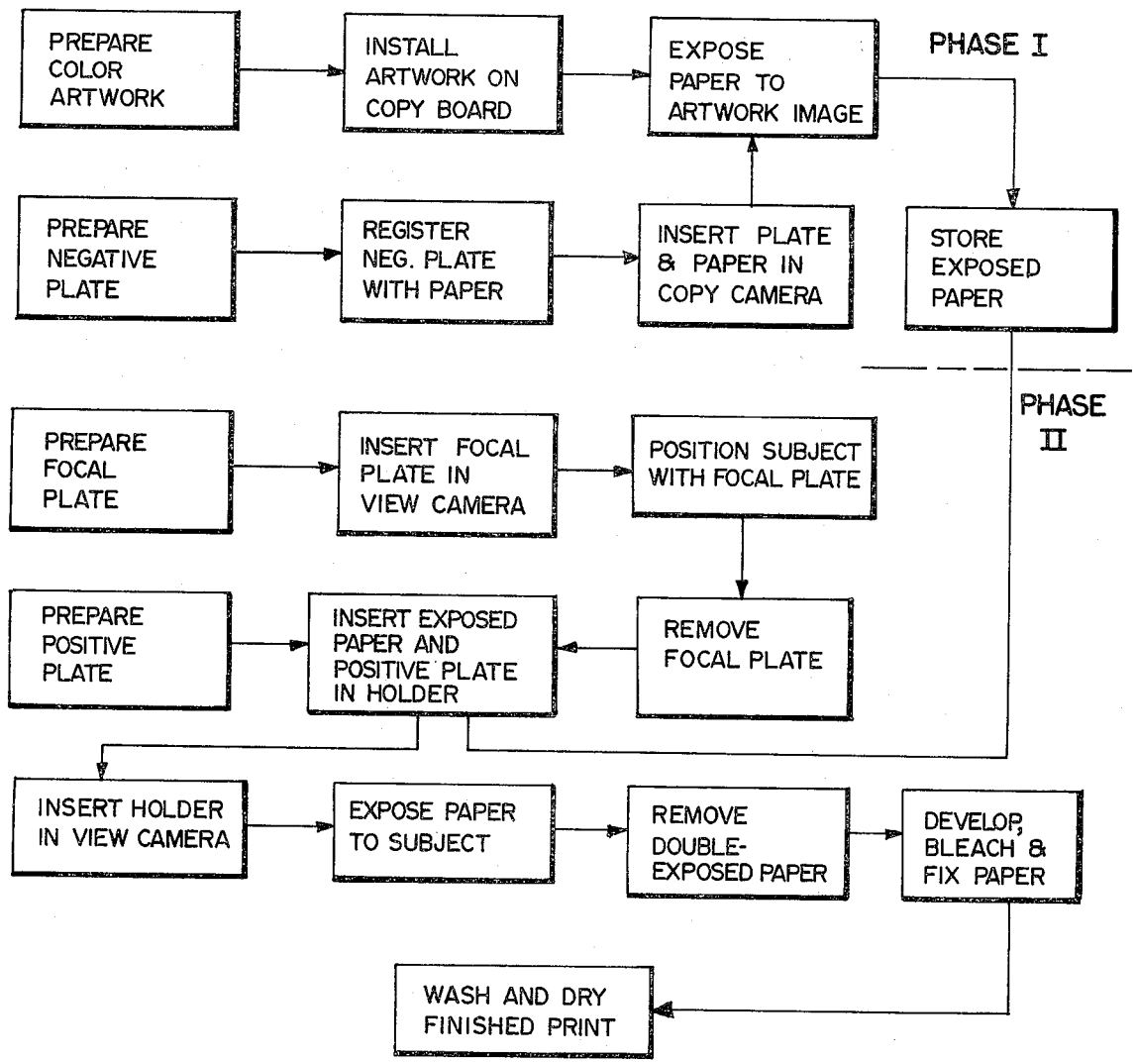
FIG. 9 is a work flow diagram illustrating typical steps in the process of the invention.

FIG. 9 is a flow diagram detailing the basic steps required to practice the process of our invention with phase I showing the first exposure and preparation of the first exposed paper and phase II showing the steps in making the second exposure of the subject and finishing the print.

We have now disclosed a process for producing striking color prints of double exposures in which the second exposure has the capability of placing a human subject, animals, or objects in close conjunction with a preexposed background which might otherwise be impossible to combine and which produces at very low cost a clear, sharply focused, saturated color print which is stable and long lasting. By the use of our novel view camera, the second exposure can be made by operators having no photographic experience or skills and can be accomplished at almost any desired location. As may be understood, our process is readily adaptable to having studios and booths set up by independent operators in various parts of the country and for having a centralized location at which a large quantity of preexposed backgrounds is produced and shipped to the various operators. We have found that most national magazines are cooperative in permitting their copyrighted and trademarked covers to be reproduced for advertising value and for possible additional income from royalties.

Although we have herein described our process and our novel view camera in detail, it will be obvious to those of skill in this art to make a number of variations and substitutions without departing from the spirit and scope of our invention.

We claim:
1. A process for producing a controlled double exposure of a color print comprising the steps of:
(a) preparing color background artwork;
(b) preparing a negative plate of the background artwork;
(c) registering the negative plate with a sheet of positive-to-positive color paper in a copy camera;
(d) focusing the copy camera on the color background artwork;
(e) exposing the color paper to the background artwork through the negative plate forming a first exposure;
(f) removing and storing the first exposed color paper without development;
(g) preparing a positive plate complementary to the negative plate;
(h) registering the first exposed color paper with the positive plate in a view camera;

(i) exposing the first exposed color paper to a subject through the positive plate, forming a second exposure thereby generating a latent image of the subject in the previously unexposed portion of the first exposed color paper; and (j) developing, bleaching, fixing and washing the first and second exposed paper to thereby produce a color photograph having the subject image disposed within the background artwork.

2. The process as defined in claim 1 which prior to step (h) includes the further steps of:

(k) preparing a translucent plate having a visible positive image thereon identical to that of the positive plate;

(l) inserting the translucent plate in the view camera;

(m) adjusting the position of the subject to place the subject in a desired location with respect to said positive image.

3. A view camera system operable by unskilled personal comprising:

a camera body having a front panel, a side panel and a rear panel;

a fixed focus lens attached to said front panel;

a paper holder door in said said panel;

a plurality of slide frames disposed within said body and accessible by opening said door;

a diagonal mirror between said lens and said slide frames and adapted to cause virtual images from said lens to occur in a plane parallel to the plane to said slide frames for reversing said image from left to right;

a sensitized paper holder slidable into any one of said slide frames wherein a virtual image is sharply focused onto paper in said holder for a different preselected distance in front of said lens for each of said slide frames;

locating means for indicating said preselected distance for each of said slide frames;

a focal plate frame having dimensions identical to those of said paper holder;

a translucent plate disposed in said focal plane frame having a visible positive image thereon identical to an undeveloped, previously exposed latent image on a sheet of sensitized paper disposed in said paper holder, said focal plane frame installable in any one of said slide frames; and a positioning door in said camera body for permitting viewing of a virtual image falling on said translucent plate to permit positioning of said subject relative to said visible positive image.

4. A photographic system for producing a portrait of a person comprising:

means for positioning the person being photographed at a selected point;

a camera body having a front panel, a side panel, and a rear panel, said camera body movable with respect to said positioning means;

a fixed focus lens attached to said front panel;

a paper holder door in said side panel;

a plurality of slide frames disposed within said camera body and accessible by opening said door;

a diagonal mirror between said lens and said slide frames and adapted to cause virtual images from said lens to occur in a plane parallel to the plane of said slide frames for reversing said image from left to right;

a holder for positive sensitized paper slidable into any one of said slide frames wherein a virtual image is sharply focused onto paper in said holder for a different preselected distance in front of said lens for each of said slide frames; and a plurality of indexing means for permitting movement of said camera body to the preselected distance for each of said slide frames.

5. A process for producing a photograph of a subject superimposed over a previously exposed background comprising the steps of:

selecting a high contrast background;

preparing a photographic negative plate from the background;

exposing a positive photographic paper through the photographic negative plate;

preparing a photographic positive plate from the background complementary to the negative plate;

registering the exposed photographic paper with the positive plate in a paper holder;

inserting the paper holder in a view camera;

photographing the subject with the view camera to produce a second exposure on the exposed photographic paper in areas not blocked by the positive plate; and developing the doubly exposed paper to produce the subject image superimposed on the background.

6. A process for producing a photographic print in color showing a subject on a simulated front cover of a magazine comprising the steps of:

preparing a black and white negative plate of a simulated magazine cover page having lettering and other graphics and having a blank area;

preparing color artwork having color blocks in the location and colors desired for the lettering and other graphics of the simulated magazine cover;

registering the negative plate with a sheet of positive to positive color paper in a copy camera;

focusing the copy camera on the color blocks of the color artwork;

exposing the color paper to the color artwork through the negative plate thereby exposing the color paper to the lettering and other graphics in the desired colors thereof;

removing and storing the exposed color paper without development;

preparing a black and white positive plate complementary to the negative plate;

registering the exposed color paper with the positive plate in a view camera thereby blocking the exposed areas of the color paper;

exposing the previously exposed color paper to a subject through the positive plate thereby forming a second exposure in the previously blank and unexposed portion areas of the color paper; and developing the doubly exposed color paper to thereby produce a color photograph having the subject image disposed within the color background artwork.

7. The process as defined in claim 6 in which the step of exposing the color paper to the background artwork includes the step of illuminating the background artwork with white light.

8. The process as defined in claim 6 in which the step of exposing the previously exposed color paper to a subject includes the further steps of:

preparing a translucent plate having a visible image thereon identical to that of the positive plate;

inserting the translucent plate in the view camera prior to inserting the paper holder in the view camera; and adjusting the position of the subject to place the subject in a desired location with respect to said positive image by viewing the virtual image of the subject on the translucent plate.

* * * * *